Patented Jan. 30, 1951

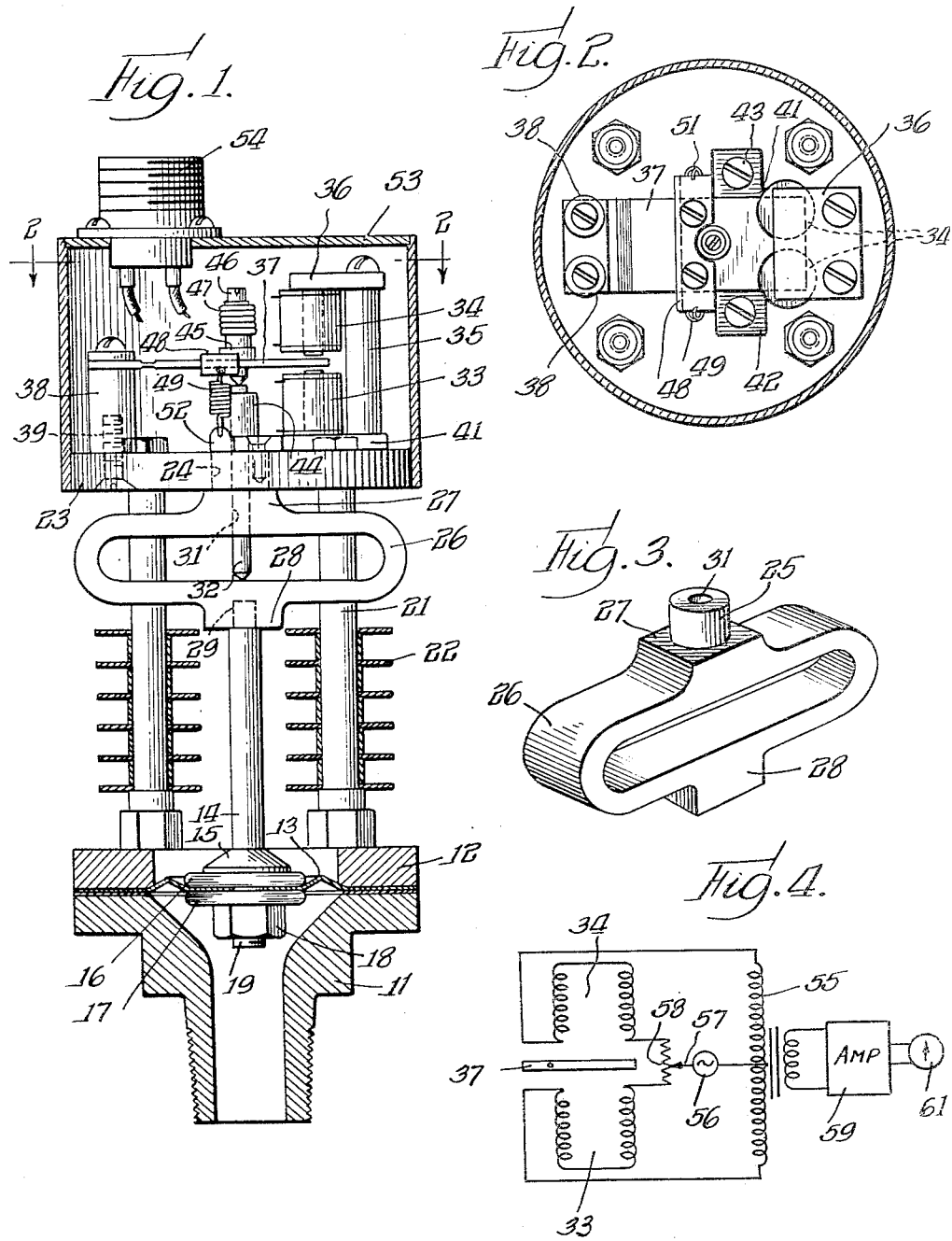

2,539,833

UNITED STATES PATENT OFFICE 2,539,833

DEVICE FOR SUPPORTING ELECTRIC PRESSURE HEAD APPARATUS

Claude M. Hathaway, Denver, Colo.

Application December 7, 1945, Serial No. 633,493

6 Claims. (Cl. 73—398)

The present invention relates to an electric pressure head of the type to be employed for measuring a fluid medium at an elevated temperature.

It frequently is desired to measure the pressure of a fluid medium, more often steam, which is at an elevated temperature with a greater degree of accuracy than is possible with conventional mechanically actuated pressure gages. Mechanically actuated pressure gages may be temperature compensated within certain limits, but for high pressure and high temperatures it frequently is found that there is a need for a greater degree of reliability and accuracy than has thus far been obtainable. To provide for the measurement of high pressures at high temperatures there may be employed in accordance with the present invention an electric pressure head which will be relatively sensitive and which will have a wide range of accuracy. This is accomplished by utilizing a diaphragm which is subject to a high pressure at a high temperature and translating the motion of the diaphragm into an electrical quantity indicative of the magnitude of the pressure exerted upon the diaphragm.

It, therefore, is an object of the present invention to provide an improved type of electric pressure head for measuring pressures at elevated temperatures.

It is a further object of the present invention to provide an improved means for measuring the pressure of a fluid medium at an elevated temperature by electrical means.

A still further object of the present invention is to provide an improved structure for an electric pressure head for measuring or indicating the pressure of a fluid medium at an elevated temperature.

Other and further objects of the present invention subsequently will become apparent by reference to the following description taken in connection with the accompanying drawing wherein Figure 1 is a side view partially in cross section illustrating an apparatus constructed in accordance with the present invention;

Figure 2 is a top view of the portion of the apparatus as seen in the direction of the arrows along the line 2—2 of Figure 1;

Figure 3 is a perspective view of one element of the apparatus shown in Figure 1; and Figure 4 is a circuit diagram showing the electrical connections for the apparatus of Figure 1.

In the drawing there is shown a diaphragm supporting member comprising a lower portion 11 and an upper ring 12 for securing in position a flexible diaphragm 13. The lower member 11 is provided with a threaded nipple portion 14 for insertion into a suitable threaded opening in a pipe, container or conduit for a fluid medium which is at an elevated temperature. This fluid medium for instance may be steam at a high temperature as in the case of super-heated steam. The diaphragm 13 is supported in between the members 11 and 12, the latter member being in the form of a ring. Centrally mounted in the diaphragm 13 is a rod 14 having a flanged lower portion 15 bearing against an upper washer 16 which engages the top surface of the diaphragm 13. The lower side of the diaphragm 13 is engaged by a washer 17 which is retained in position by a nut 18 on the threaded lower extremity 19 of the rod 14. The upper ring 12 supports a plurality of posts 21 which preferably are of a material having a poor heat conductivity. The posts 21 for example may be hardened steel since hardened steel is a poor conductor of heat. The posts 21 are furthermore provided with a plurality of spaced steel flanges 22 which serve to radiate heat from the posts or studs 21.

The posts or studs 21 carry at their upper extremities a support plate 23 which carries an apparatus for translating mechanical motion into electrical quantities. The plate 23 has a central aperture 24 for receiving a cylindrical apertured stud portion 25 of a proving ring 26 shown in perspective in Figure 3. The proving ring 26 has a generally flat elliptical central configuration having on each side bosses 27 and 28. The upper boss 27 carries the cylindrical stud 25. The lower boss 28 is provided with an aperture 29 which engages the reduced upper end portion of the rod 14. The central opening 31 of the cylindrical stud portion 25 extends through the upper half of the proving ring 26 so as to receive a movable rod 32 which extends up above the support plate 23.

The support plate 23 carries a plurality of pairs of electromagnetic coils 33 and 34, the upper coils being supported from a stud 35 having a support bracket or arm 36. Interposed between the lower pair of magnetic coils 33 and the upper pair of magnetic coils 34 is a movable armature 37 which is supported from a support post 38 which is rigidly secured to the base plate 23 by any suitable means such as a pin 39.

The support post 35, which carries the bracket 36 upon which the upper pair of magnets 34 are supported, is mounted on a base plate 41 having laterally extending portions 42 provided with suitable apertures for receiving fastening screws 43 which engage the support plate 23. The base 41 carries a guide sleeve 44 for receiving the upper end of the movable rod 32 which normally extends a short distance above the upper end of the sleeve 44. The armature 37 is provided with a threaded cylindrical stud or sleeve 45 which carries a set screw 46, the lower end of which engages the upper end of the movable rod 32. The upper portion of the set screw 46 is surrounded by a coil spring 47 to retain the set screw, 46 in any adjusted position. By means of the set screw 46 the position of the armature 37 may be adjusted so as normally to be midway between the pole pieces of the pairs of magnets 33 and 34. The armature 37 is biased toward the upper end of the rod 32 by a bridging strap 48 having at each end depending apertured sides for engagement by springs 49 and 51. The springs 49 and 51 engage suitable ears 52 mounted on one extremity of the base plate 41.

The motion translating means comprising electromagnetic coils and the movable arm is enclosed by a cover 53 which may have a suitable conduit outlet 54 which carries electrical wires interconnecting different apparatus with the indicating amplifier and meter.

The electromagnetic coils 33 and 34 having a movable armature 37 therebetween are shown connected in a circuit in Figure 4 which includes a transformer 55, having a center tap primary winding. This winding is connected to one side of a source of alternating current 56 which may have a frequency of several thousand cycles per second. The other side of the source of alternating current 56 is connected to the adjustable contact 57 of a voltage divider 58 which is connected between the two pairs of electromagnets 33 and 34. The adjustable contact 57 on the voltage divider 58 is provided for balancing the circuit so that with no pressure applied to the diaphragm 13 of the apparatus shown in Figure 1 there will be no output voltage present in the secondary winding of the transformer 55. The secondary winding of the transformer 55 is connected through an amplifier 59 which in turn is connected to a suitable indicating instrument 61 which may be calibrated in terms of the pressure to be measured by the diaphragm 13.

Assuming that the member 11 is mounted so as to be in communication with a fluid medium at an elevated temperature the diaphragm 13 will be subjected to the pressure of the fluid medium. The electrical translating apparatus carried on the support plate 23 is substantially heat insulated by virtue of the remote position from the fluid conduit, and hence is not subject to any great variation in temperature. The rod 14 moves in accordance with the pressure exerted upon the diaphragm 13 to compress the proving ring 26. Any compression of the proving ring 26 is reflected in a movement of the rod 32 which engages the set screw or stop 46 secured to the armature 37. A movement of the armature 37 will bring about an increase in the impedance of one pair of magnetic coils and a corresponding decrease in impedance of the other pair of coils. This variation in the impedances of the electromagnetic coils 33 and 34 unbalances the circuit shown in Figure 4 so that there is transmitted energy to the amplifier 59 which may energize a suitable indicating instrument 61 thus to show the amount of pressure exerted upon the diaphragm 13.

While for the purpose of illustrating and describing the present invention, the drawings show a certain embodiment, it is to be understood that the invention is not to be limited thereby since such variations in the components employed and in their arrangement are contemplated as may be commensurate with the spirit and scope of the invention set forth in the following claims.

This invention is hereby claimed as follows:

1. A device for translating the pressure of a fluid medium which is at an elevated temperature into a linear displacement comprising a member movable in accordance with pressure changes, a plurality of rigid elongated hardened steel rod supports of relatively low heat conductivity for supporting at a distance from said pressure movable member a displacement translating apparatus, a proving ring mounted adjacent said apparatus, a rod interconnecting said ring with said pressure movable member, and a second rod inter-connecting said apparatus with said proving ring to produce movement proportional to pressure changes of said fluid medium.

2. In an apparatus for measuring the pressure of a fluid medium which is at an elevated temperature the combination comprising a diaphragm responsive to the pressure changes of said fluid, a plurality of rigid supports of relatively low heat conductivity for supporting at a distance from said diaphragm a displacement translating apparatus, a proving ring mounted adjacent said apparatus, a rod rigidly inter-connecting said ring with said diaphragm, and a movable rod inter-connecting said proving ring with said apparatus to produce a movement proportional to pressure changes of said fluid medium.

3. A device for supporting apparatus for measuring the pressure of a fluid medium which is at an elevated temperature comprising a member having a diaphragm responsive to the pressure of said fluid medium, a plurality of rigid elongated supports having a plurality of heat dissipating flanges for supporting said apparatus, a proving ring mounted adjacent said apparatus, a rod rigidly inter-connecting said ring with said pressure responsive diaphragm, and a second rod inter-connecting said apparatus with said proving ring to produce movement proportional to the movement of said diaphragm.

4. In a pressure measuring device the combination comprising a member having a threaded portion adapted to be connected to a source of fluid medium which is at an elevated temperature, said member carrying a diaphragm movable in response to pressure changes of said fluid medium, a plurality of rigid supports of relatively low heat conductivity having a plurality of heat dissipating flanges for supporting at a distance from said diaphragm a displacement translating apparatus, a proving ring rigidly mounted at one side of said apparatus and inter-connected by a rod with said diaphragm, and a second rod interconnecting the movable side of said proving ring with said apparatus.

5. In a device for measuring the pressure of a fluid medium such as steam which is at an elevated temperature, the combination comprising a member having an opening adapted to be connected to a source of fluid medium, a pressure responsive diaphragm mounted in said opening, four hardened steel elongated supports mounted on said member, said supports being constructed so as to be rigid and having a relatively low rate of heat conductivity, a support plate for translating apparatus mounted on said support, a proving ring mounted on the underside of said support plate, a rod rigidly inter-connecting said proving ring with said pressure responsive diaphragm, and a movable rod inter-connecting the movable side of said proving ring with translating apparatus mounted on said support member.

6. A device for an electric pressure head apparatus for measuring the pressure of a fluid medium such as steam which is at an elevated temperature comprising a member having a recess adapted to be in communication with the fluid medium, the pressure of which is to be measured, a flexible diaphragm carried by said member, a plurality of elongated supports mounted on said member, said elongated supports being constructed so as to have a relatively low rate of heat conductivity, a transverse support member carried by said elongated supports for supporting said apparatus, a proving ring having a generally elliptical configuration rigidly mounted on the under side of said transverse support, a rod rigidly inter-connecting the other side of said proving ring with said flexible diaphragm, a movable rod interconnecting the movable side of said proving ring with apparatus mounted on said support to produce movement in accordance with movement of said pressure responsive diaphragm.

CLAUDE M. HATHAWAY.

REFERENCES CITED

The following references are of record in the file of this patent:

UNITED STATES PATENTS

| Number | Name | Date |
|---|---|---|
| 1,718,494 | Schurig | June 25, 1929 |
| 1,897,811 | Martin | Feb. 14, 1933 |
| 1,950,532 | Wasson | Mar. 13, 1934 |
| 2,260,837 | Kuehni | Oct. 28, 1941 |
| 2,266,608 | Kuehni | Dec. 16, 1941 |
| 2,376,156 | Kuehni | May 15, 1945 |